(No Model.) 2 Sheets—Sheet 2.

G. R. CULLINGWORTH.
APPARATUS FOR DRYING COMPRESSED AIR.

No. 357,703. Patented Feb. 15, 1887.

Witnesses:
C. L. Sundgren
Emil Herter

Inventor:
Geo. R. Cullingworth
by his attys
Brown & Hall

UNITED STATES PATENT OFFICE.

GEORGE R. CULLINGWORTH, OF NEW YORK, N. Y.

APPARATUS FOR DRYING COMPRESSED AIR.

SPECIFICATION forming part of Letters Patent No. 357,703, dated February 15, 1887.

Application filed June 7, 1886. Serial No. 204,331. (No model.)

*To all whom it may concern:*

Be it known that I, GEORGE R. CULLINGWORTH, of the city and county of New York, in the State of New York, have invented a new and useful Improvement in Apparatus for Drying Compressed Air, of which the following is a specification.

In the operation of air-compressors water is frequently admitted to the cylinders of the compressors in order to cool the air, and the compressed air is often charged with a considerable quantity of moisture. I have discovered that by passing compressed air through a sieve or fine strainer, or, in other words, by subjecting the compressed air to a straining or sieving operation, the greater proportion of water which it may carry in suspension will be entangled by the fine interstices or meshes of the sieve or screen, and will thereby be separated from the air. Such a process for drying air forms the subject of my application for Letters Patent, Serial No. 188,703, filed January 15, 1886; and the object of my present invention is to provide an apparatus whereby the compressed air may be cooled simultaneously with the straining or sieving operation to which it is subjected and the separation of the water from the air facilitated.

My invention consists, essentially, in the combination, with a receiving-vessel for compressed air, of a tubular screen or sieve, and an approximately concentric coil for the circulation of cooling-fluid, extending from end to end of the vessel, and pipes communicating with the vessel, one without and the other within the screen or sieve and coil, and serving one for the inlet and the other for the outlet of compressed air. I preferably employ two concentric cylindric and tubular screens or sieves and a coil, which is also approximately concentric with them and interposed between them.

The invention further consists in other combinations of parts, which are hereinafter described, and pointed out in the claims.

Figure 1:
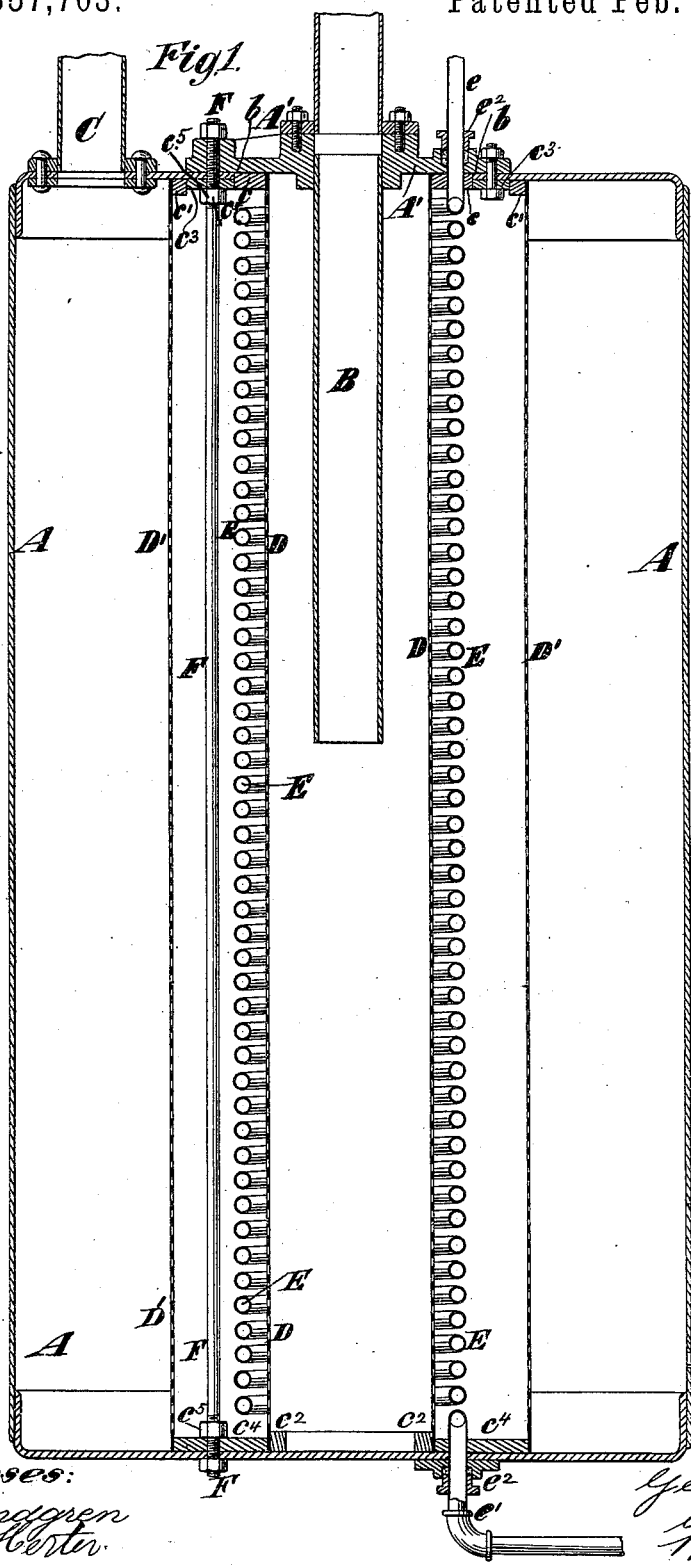
Figure 2:
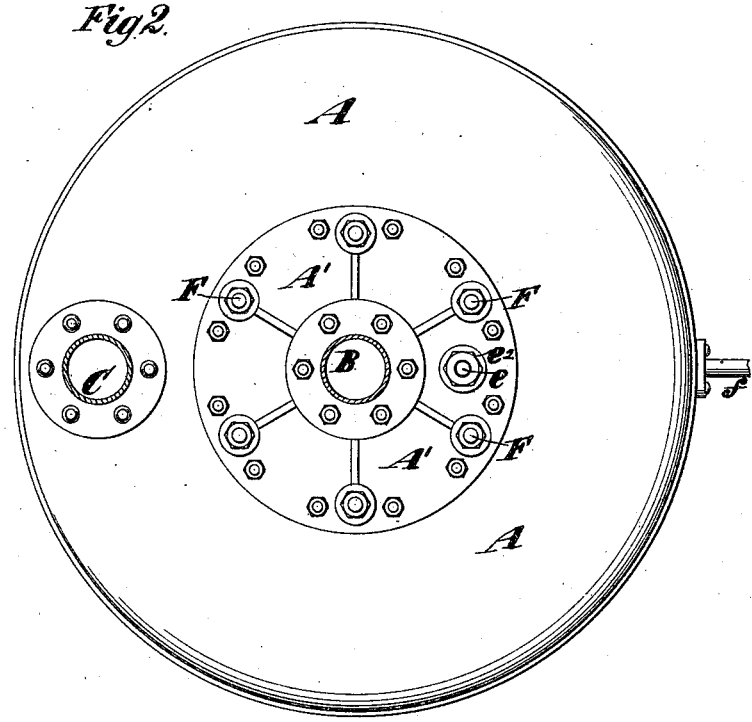
Figure 3:
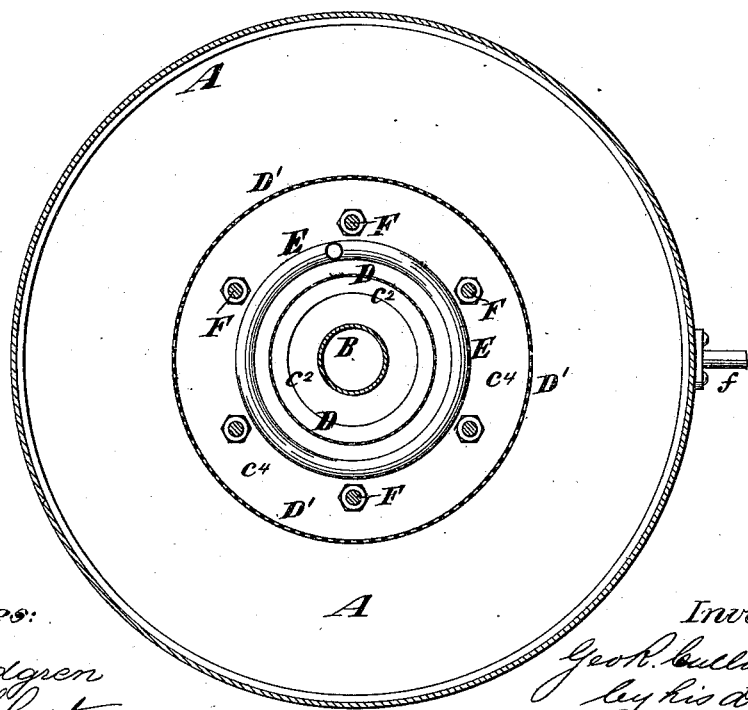

In the accompanying drawings, Figure 1 is a vertical section of the cylindric upright air-receiving vessel embodying my invention. Fig. 2 is a plan thereof; and Fig. 3 is a horizontal section through such vessel.

Similar letters of reference designate corresponding parts in the several figures.

A designates an upright cylindric vessel for receiving compressed air, and which is provided with two pipes, B C, one serving for the inlet of compressed air from an air-compressor into the vessel A, and the other serving as the outlet for dried compressed air from the vessel.

The vessel here shown may be principally of boiler-iron or other suitable metal, and its upper head has in it a comparatively large central opening, $b$, closed by a cast-metal cap or cover, A'.

Arranged within and extending from end to end of the vessel A are a screen or sieve, which may be of fine wire-gauze, and a coil of pipe for the circulation of cooling-fluid, and which is arranged approximately concentric with the screen or sieve. I have here represented two cylindric screens or sieves, D D', the screen D' being larger in diameter, and surrounding the inner screen, D, and the coil E, of pipe or tubing, for the circulation of cooling-fluid. The screens or sieves may be held in concentric positions by rings or disks $c\, c'\, c^2$, preferably made of wood, and other rings, $c^3\, c^4$, of metal, and the vessel A is provided with stay-bolts F, which extend from end to end thereof and through the heads. As here represented, the bolts F pass through the metal rings or annular plates $c^3\, c^4$, and are provided inside the vessel with nuts $c^5$, which form adjustable shoulders for the bolts. The coil E, for the circulation of cooling-fluid, is, as here shown, interposed between the two screens or sieves D D', and at one end it has connected with it an inlet-pipe, $e$, for cooling-fluid, and from the other end extends an outlet-pipe, $e'$, for the escape of cooling-fluid. The pipes $e\, e'$ may be passed through stuffing-boxes $e^2$ in the heads of the vessel A, to prevent the leakage of air. In this example of the invention the pipe B, which enters the head of the vessel at about the center and extends inward thereinto within the screen D, is intended for the inlet of compressed air, and the pipe C is intended for the outflow of air after it has been dried. Good results, however, might be obtained by reversing the functions of these pipes and employing the pipe C as an inlet-pipe and the pipe B as an outlet-pipe. The vessel A may also have a drain-pipe, $f$, through which may be drawn off from the vessel water which accumulates in the bottom thereof, and which is freed from the air by the action of the sieves or screens D D'.

Compressed air entering through the pipe B is well distributed throughout the length of the screen D, and by passing through the fine meshes or interstices of this screen becomes freed from a portion of its moisture. Before the air passes through the second or outer screen, D', it comes in intimate contact with the convolutions of the coil E, through which cooling-fluid is constantly circulating by a pump or gravity, and by the cooling which the air receives from contact with the coil E the second or outer screen, D', is made more effective in drying the air.

What I claim as my invention, and desire to secure by Letters Patent, is—

1. The combination, with a receiving-vessel for compressed air, of a tubular screen or sieve and an approximately concentric coil for the circulation of cooling-fluid extending from end to end of the vessel, and pipes communicating with the vessel, one within and the other without the screen or sieve and coil, and serving one for the inlet and the other for the outlet of compressed air, substantially as herein described.

2. The combination, with a receiving-vessel for compressed air, of two tubular screens or sieves and an interposed coil, all arranged approximately concentric within the vessel and extending from end to end thereof, and pipes communicating with the vessel, one within and the other without the screens or sieves and coil, and serving one for the inlet and the other for the outlet of compressed air, substantially as herein described.

3. The combination, with an air-receiving vessel and an inlet-pipe for compressed air, of a tubular screen or sieve and a coil for the circulation of cooling fluid surrounding the inlet-pipe, and an air-outlet pipe leading from the vessel at a point beyond or outside the screen or sieve and coil, substantially as and for the purpose herein described.

4. The combination, with an upright cylindrical air-receiving vessel and an inlet-pipe for compressed air leading into the vessel in the direction of its axis, of a cylindric screen or sieve and a coil for the circulation of cooling-fluid surrounding the inlet-pipe and extending from end to end of the vessel, and an air-outlet pipe leading from the vessel at a point beyond the screen or sieve, substantially as herein described.

G. R. CULLINGWORTH.

Witnesses:
FREDK. HAYNES,
HENRY J. McBRIDE.